United States Patent [19]

Park

[11] Patent Number: 5,017,201
[45] Date of Patent: May 21, 1991

[54] TANK TYPE LIQUID AIR CLEANER

[76] Inventor: Chul Park, 1837 Green Place Ter., Rockville, Md. 20850

[21] Appl. No.: 511,755

[22] Filed: Apr. 20, 1990

[51] Int. Cl.⁵ .......................................... B01D 47/02
[52] U.S. Cl. .................................... 55/227; 55/95; 55/244; 55/DIG. 3; 15/353; 261/79.2
[58] Field of Search ................... 55/95, 227, 235, 244, 55/247, 248, DIG. 3; 15/353; 261/79.2, 123

[56] References Cited

U.S. PATENT DOCUMENTS

| | | |
|---|---|---|
| 1,817,265 | 5/1930 | Pando . |
| 2,208,673 | 3/1939 | Hopkins . |
| 3,353,336 | 11/1967 | Caballero .......................... 55/244 X |
| 3,745,745 | 7/1973 | Mare ........................................ 55/95 |
| 3,930,281 | 1/1976 | Principe et al. ....................... 15/320 |
| 3,980,080 | 9/1976 | Muto ................................. 55/244 X |
| 4,005,999 | 2/1977 | Carlson .................................. 55/93 |
| 4,179,768 | 12/1979 | Sawyer .................................. 15/352 |
| 4,487,746 | 12/1984 | Tahiliani ............................. 422/170 |
| 4,585,599 | 4/1985 | Czarno ................................... 261/2 |

Primary Examiner—Charles Hart
Attorney, Agent, or Firm—Birch, Stewart, Kolasch & Birch

[57] ABSTRACT

A tank type liquid air cleaner which comprises a L-shaped air inlet pipe, a liquid tank, an overflow cylinder within the liquid tank, a ball valve in a tapered ball valve containing tube disposed in the lower portion of the liquid tank, a nozzle injection member, and a fan, whereby the air cleaner effectively cleans dirty air containing dust and debris and can be easily and completely cleaned the internal surface of the overflow cylinder and the liquid tank.

7 Claims, 3 Drawing Sheets

TANK TYPE LIQUID AIR CLEANER

BACKGROUND OF THE INVENTION

1. Field of the Invention

The present invention relates to a tank type liquid air cleaner which cleans dirty air containing dirt and debris over the surface of a liquid such as water and more particularly, to an improved tank type liquid air cleaner including a L-shaped inlet tube, a liquid tank, an overflow cylinder, a ball valve, a venting outlet, and a fan for readily and effectively cleaning the dirty air containing dirt and debris. Also the tank type liquid air cleaner serves another function as a humidifier.

2. Description of the Prior Art

Various types of air or vacuum cleaners which operate on the principle of passing dust, debris, or dirty air over the surface of a liquid are known in the art. However, such cleaners suffer from various disadvantages. It is very difficult to effectively clean the dust, debris and dirty air containing dust and debris in the liquid tank since these dirty materials are not readily soluble in the liquid and it is also a difficult task to completely clean the liquid tank therein and to assemble and disassemble the cleaner since the cleaner has a complicated structure. Such conventional vacuum or air cleaners are shown in Pando U.S. Pat. No. 1,817,265, Hopkins U.S. Pat. No. 2,208,673, Mare U.S. Pat. No. 3,745,745, Principe et al U.S. Pat. No. 3,939,281, Carlson U.S. Pat. No. 4,005,999, Sawyer U.S. Pat. No. 4,179,768, Tahiliani U.S. Pat. No. 4,487,746, and Cyarno U.S. Pat. No. 4,585,599.

SUMMARY OF THE INVENTION

Accordingly, it is an object of the present invention to provide an improved tank type liquid air cleaner which completely and effectively cleans dirty air containing dust and debris since these dirty materials can be forcefully mixed air with the liquid in a liquid tank.

Another object of the present invention is to provide a tank type liquid air cleaner which serves another function as a humidifier and can be completely cleaned the internal surface of the liquid tank thereof.

A further object of the present invention is to provide a tank type liquid air cleaner which includes a ball valve in a tapered ball valve containing tube for tightly closing the upper end of the tube to prevent the separated waste product from contaminating with the liquid in a overflow cylinder disposed within a liquid tank.

Still another object of the present invention is to provide a tank type liquid air cleaner is simple in construction, compact for portability, inexpensive to manufacture, durable in use since there is no filter therein, and refined in appearance.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a tank type liquid air cleaner which comprises a L-shaped air inlet tube, a liquid tank, an overflow cylinder within the liquid tank, a ball valve in a tapered ball valve containing tube disposed in the lower portion of the liquid tank, a nozzle injection member, and a fan, whereby the tank type liquid air cleaner effectively cleans dirty air containing dust and debris and can be easily and completely cleaned the internal surface of the overflow cylinder and the liquid tank.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
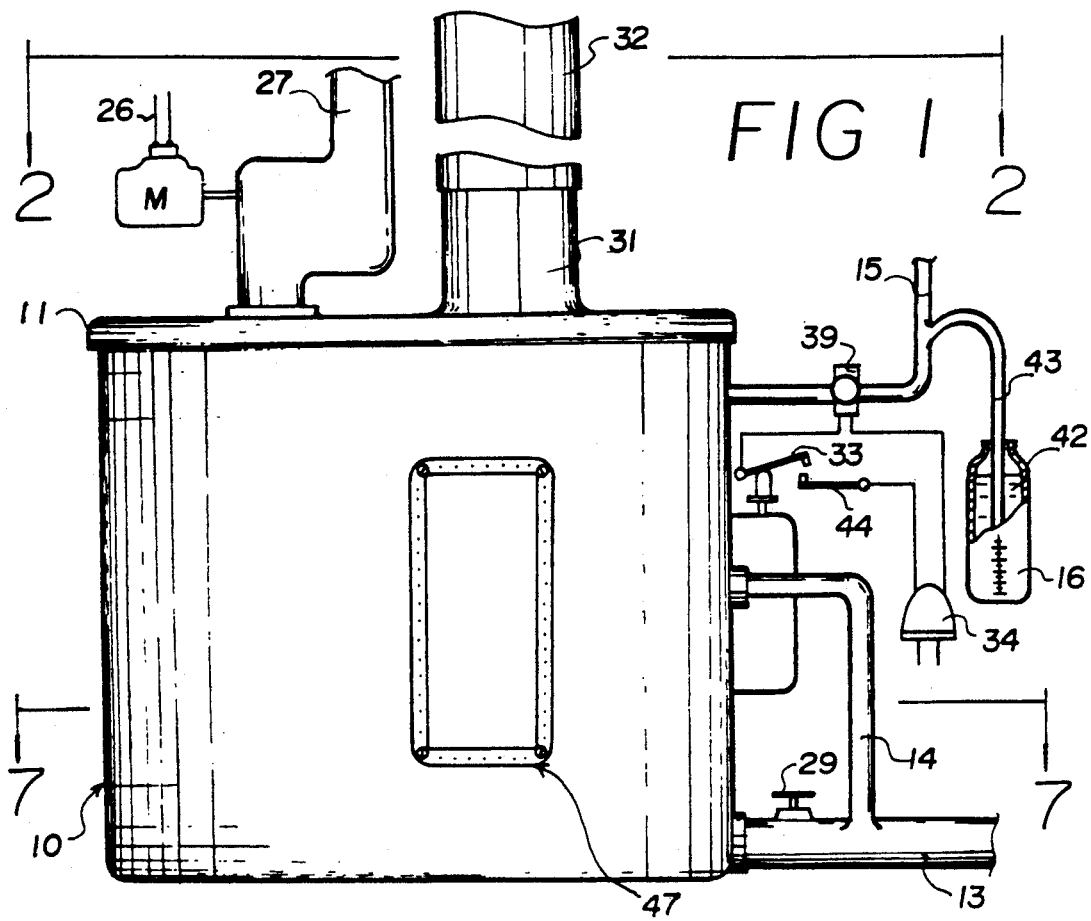
FIG. 1 is a front elevational view of a tank type liquid air cleaner according to the present invention.
Figure 2:
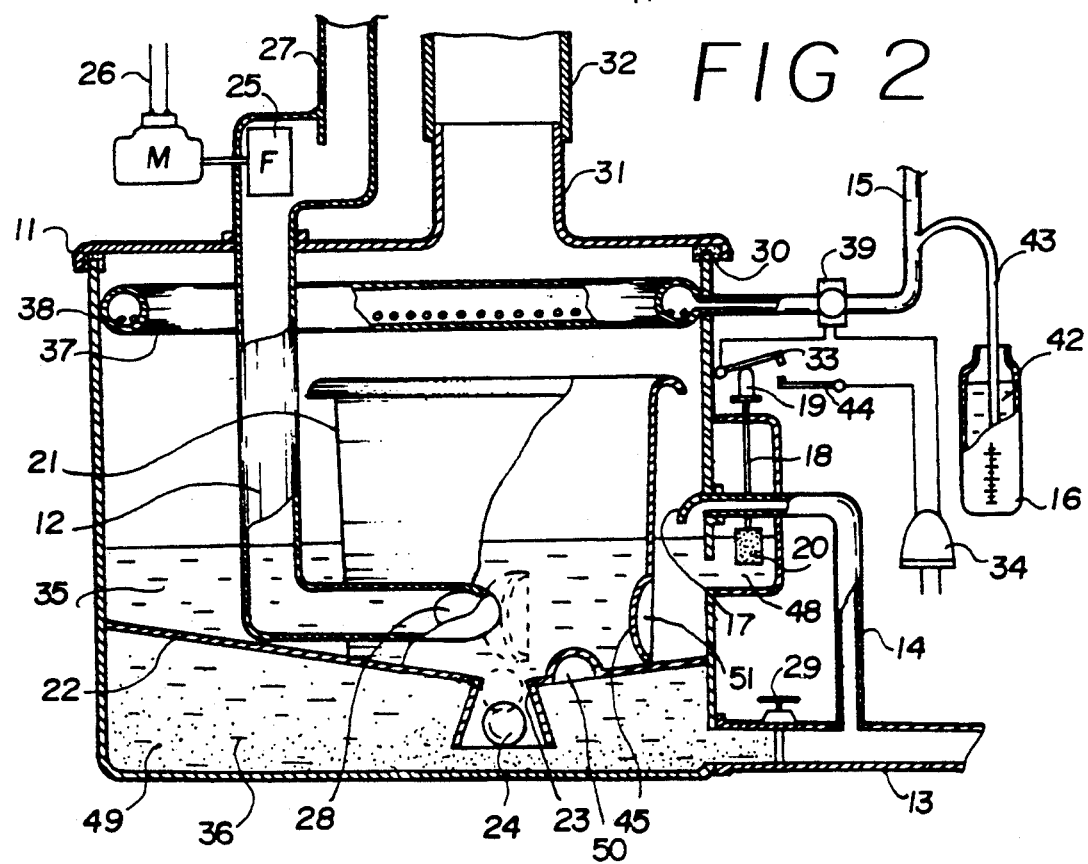
FIG. 2 is a sectional view of FIG. 1, taken along lines 2—2.

Referring now in detail to the drawings for the purpose of illustrating preferred embodiments of the present invention, the tank type liquid air cleaner as shown in FIGS. 1 and 2 comprises a liquid tank 10, a tank cover 11 for covering the liquid tank 10, an air inlet tube 12 connected to the lower portion of the liquid tank 10, an overflow cylinder 21 disposed within the liquid tank 10, a fan housing 25 extending from the air inlet tube 12 for housing a fan F, a motor M, a venting outlet tube 31 disposed on the tank cover 11, an inclined partition 22 disposed at the lower portion of the liquid tank 10 for forming a collecting room 36, a float 20, a detergent container 16, a nozzle member 37 disposed at the upper portion of the liquid tank 10.

The liquid tank 10 contains liquid 35 such as water and the top level of the liquid 35 is disposed about one third the distance from the bottom of the liquid tank 10. Also, one end of the air inlet tube 12 has an L-shaped configuration 28 inserted into the liquid 35 for forcefully mixing air with the liquid 35 in overflow cylinder 21 within the liquid tank 10. The other end of the air inlet tube 12 is connected to the fan housing 25 and further connected to an air supply duct 27.

Also, the liquid tank 10 includes a transparent window 47 for inspecting the liquid level in the liquid tank 10 to maintain the liquid 35 therein. The liquid tank 10 is provided with rubber packing material 30 disposed along the circumference thereof for tightly fitting the tank cover 11 thereto. The liquid tank 10 is provided with a float containing room 48 extended therefrom for containing the float 20 so as to prevent the float 20 from contacting with the forceful mixing liquid. The liquid tank 10 includes a drain line 13 having a liquid draining switch 29 disposed at the bottom portion and a liquid overflow line 14 disposed at the middle portion thereof, wherein the liquid overflow line 14 is provided with a downward edge 17 for preventing the liquid 35 from entering into the overflow line 14 in the operation position.

Figure 7:
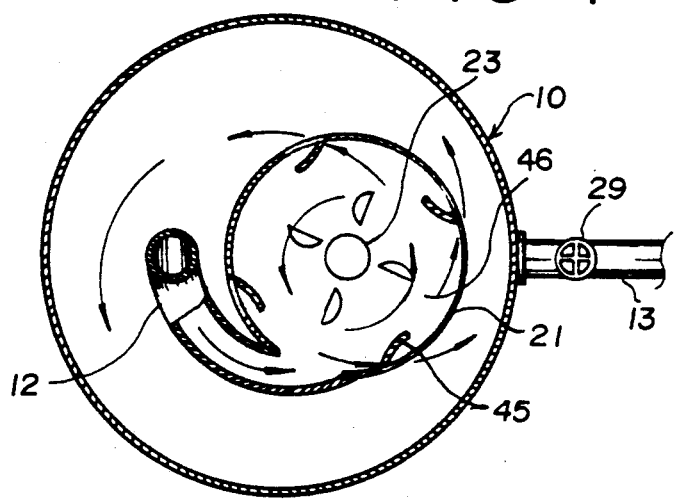
FIG. 7 is a cross-sectional view of FIG. 1, taken along line 5—5, showing the dirty air containing dust and debris is rotted along the wall of the liquid tank.
Figure 8:
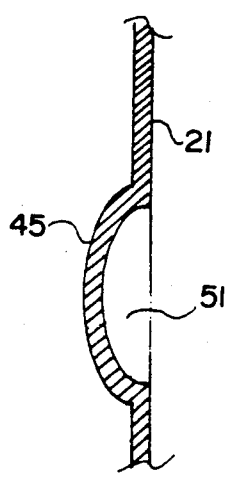
FIG. 8 is a sectional view of a C-shaped valve mounted to the wall of an overflow cylinder.
Figure 9:
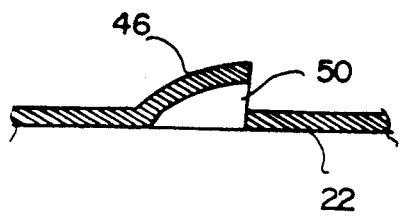
FIG. 9 is a sectional view of a C-shaped valve mounted to the partition disposed at the lower portion of the liquid tank.

The inclined partition 22 for separating the operating liquid from the waste product 49 is provided with the collecting room 36 disposed in the bottom of the liquid tank 10. Also, the partition includes a tapered cylinder 23 for containing a movable ball valve 24 within the tapered cylinder 23 to prevent the dirty material 49 from contaminating with the liquid 35 in the overflow cylinder 21 in the operation position and passing away the waste product 49 from the overflow cylinder 21 therethrough to the collecting room 36 in the non-operation position. The partition 22 includes a plurality of C-shaped valves 46 toward to the bottom for forming apertures 50 to pass away the liquid 35 through the aperture 50 so as to push up the movable ball valve 24 by the inertia of the liquid flow 35 for tightly fitting the top of the tapered tube 23 (FIGS. 7 and 9). The inclined partition 22 has an inclined configuration centerwardly for collecting the waste product 49 into the top hole of the tapered tube 23.

As shown in FIGS. 2, 3, 4, and 9, the overflow cylinder 21 receives the L-shaped configured end 28 toward to the annular corner of the bottom thereof so that the dirty air with liquid 35 can be forcefully gyrated as in a storm. Also the overflow cylinder 21 includes the plurality of C-shaped valves 46 toward to the interior wall thereof for accelerating the liquid storm flow and returning the overflowed liquid to the overflow cylinder therethrough.

Figure 4:
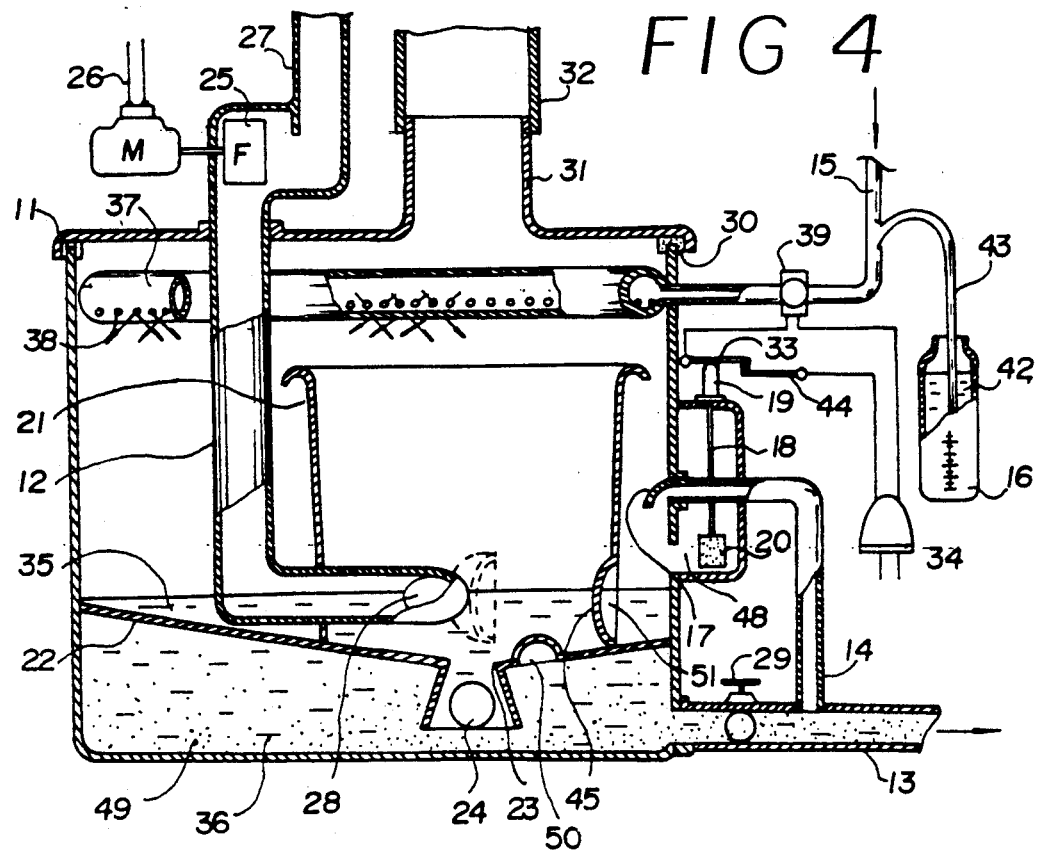
FIG. 4 is a front elevational view of the tank type liquid air cleaner according to the present invention containing cut away portions in order to illustrate the tank type liquid air cleaner in the close position.
Figure 5:
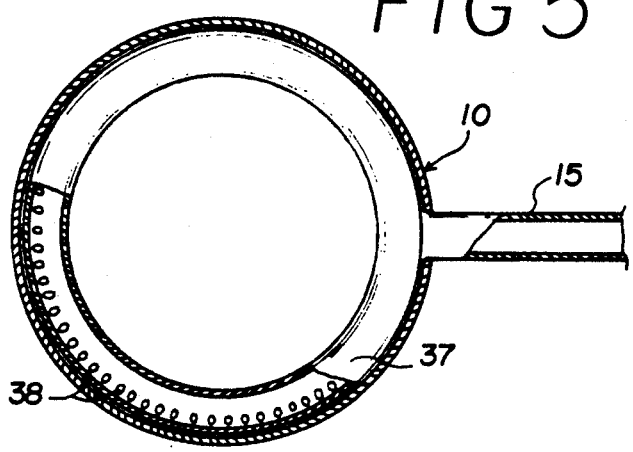
FIG. 5 is a top plan view of the tubular ring having a plurality of injection nozzles of a tubular ring nozzle member of the tank type liquid air cleaner according to the present invention containing cut away portions in order to illustrate the construction of the tubular ring nozzle member.

As shown in FIGS. 4 and 5, the nozzle member 37 having a tubular ring configuration includes a plurality of injection nozzles 38 for completely washing and cleaning the walls of the liquid tank 1? and the overflow cylinder 21. The nozzle member 37 is connected to a liquid supply pipe 15 through a liquid switch valve 39. At that time, a detergent container 16 may be connected to the liquid supply pipe 15 for adding the detergent to the liquid 35 by the syphon principle so as to effectively clean the walls.

Figure 6:
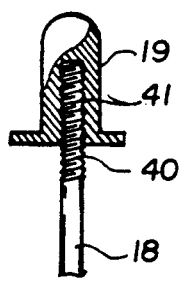
FIG. 6 is a front elevational view of a float adjusting member for maintaining liquid in the liquid tank floating member of the tank type liquid air cleaner according to the present invention containing cut away portions in order to illustrate the construction of the float adjusting member.

As shown in FIGS. 2 and 6, the float 20 is connected to a float rod 18 having an outer screw 40 disposed within the float containing room 48 for mating with an inner screw 41 of a water level adjusting cap 19 so as to adjust the water level of the liquid tank 10. The water level adjusting cap 19 connected to the float 20 is actuated a microswitch 33 through a connecting member 44 to control the liquid switch valve 39 for maintaining the liquid 35 in the liquid tank 10. A reference numeral 34 is an electrical plug for connecting to the connecting member 44 and the liquid switch valve 39.

The fan housing 25 contains the fan F for pumping the dirty air including dust and debris to send it into the overflow cylinder 21 through the L-shaped configured end 28. The motor M is connected to the fan F and also, is connected to an electric wire 26 which is in turn connected to the thermostat (not shown). The tank cover 11 is provided with a venting outlet 31 disposed in the center thereof and the air outlet 31 is connected to air outlet duct 32 to be delivered the cleaned air to rooms.

Figure 3:
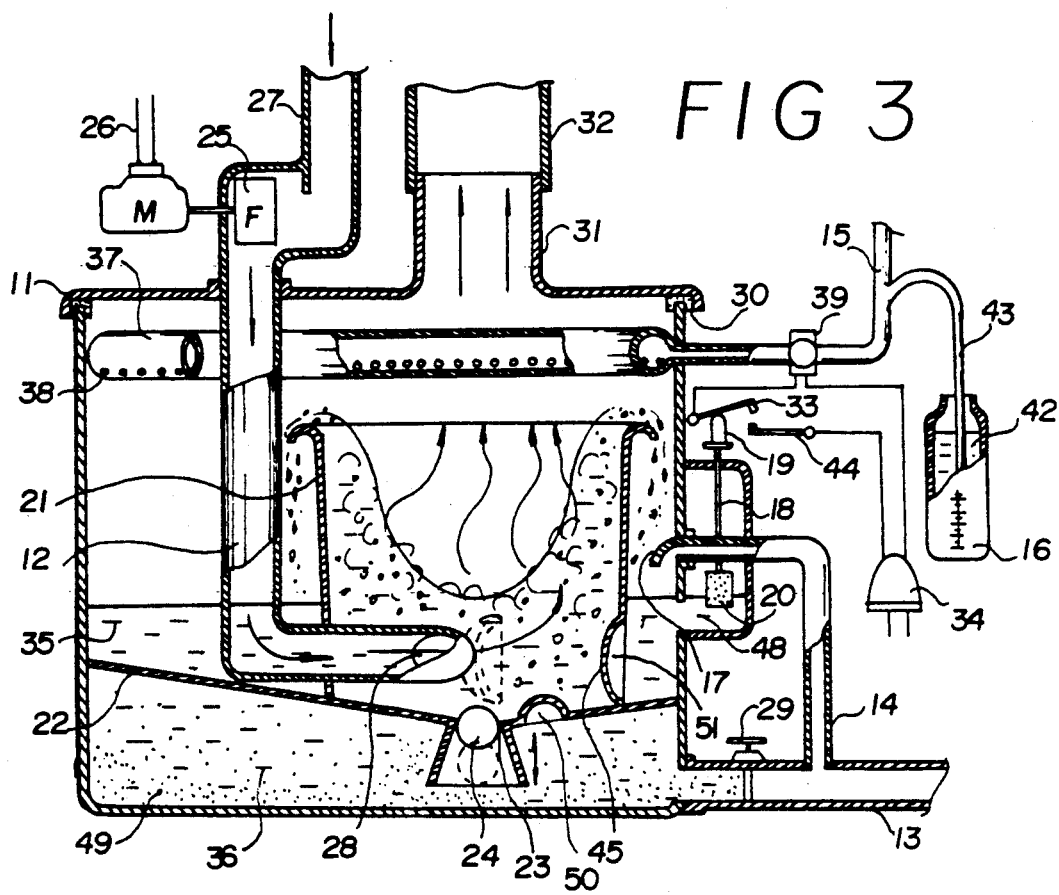
FIG. 3 is a front elevational view of the tank type liquid air cleaner according to the present invention containing cut away portions in order to illustrate the liquid cleaning operation of the dirty air in the liquid tank in the operation position.

According to the present invention, the tank type liquid air cleaner operate as follows:

As shown in FIG. 2, when the motor M is actuated and the fan F in the fan housing 25 is actuated. Therefore, since the fan F is pumping the dirty air from the air supply duct 27 to the air inlet tube 12, the dirty air including dust and debris can be mixed and scrubbed with the liquid 35 such as water in the overflow cylinder 21 disposed within the water tank 10. At this time, since the overflow cylinder 21 has the plurality of C-shaped valves 45 disposed on the interior wall thereof, the air mixed liquid including the dust and debris is forcefully mixed with the liquid 35 as a storm again and the cleaned air is vented from the waste product 49 mixed liquid. Therefore, the cleaned air is vented to the venting outlet 31 and delivered to the air outlet duct 32. And the dirty material 49 mixed liquid overflows through the top circumferential edge of the overflow cylinder 21 and then, the liquid 35 is returned to the overflow cylinder 21 through the plurality of aperture 50 for reusing and the waste product 49 is collected and settled in the collecting room 36 along the inclined partition 22 and through the plurality of apertures 51 (FIG. 3). At this time, the movable ball valve 24 has to fit tightly the top hole of the tapered tube 23 due to the inertia of liquid flow (FIG. 7).

As shown in FIG. 4, when the motor M and the fan F are stopped and the draining switch is open, the microswitch 33 is contacted to the connecting member 19 due to the float cap 19 of the float 20. At this time, the liquid supply on/off switch 39 is open, the liquid 35 with the detergent 42 from the detergent container 16 is injected to walls of the overflow cylinder 21 and the liquid tank 10 through the plurality of injection nozzles 38 of the tubular ring nozzle member 37 and simultaneously, the movable ball valve 24 releases from the top hole of the tapered cylinder 23 for dirty liquid and the settled waste product 49 in the collecting room 36 can be readily removed from the liquid tank 10 to the liquid draining line 13.

The tank type liquid air cleaner according to the present invention can be easily disassembled by releasing the tank cover 11 and serves another function as a humidifier.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A tank type liquid air cleaner which passes dirty air over a surface of a liquid, which comprises:

a liquid tank containing liquid, said liquid tank provided with a float containing room extending therefrom, an overflow cylinder disposed within said liquid tank, said overflow cylinder having a plurality of C-shaped valves in the wall thereof for accelerating liquid flow, an air inlet having an L-shaped end at the one end thereof for inserting into a lower portion of said overflow cylinder for forcefully mixing air with the liquid, said air inlet connected to an air supply duct at the other end thereof, a tank cover slidably and tightly attached to said liquid tank, a centerwardly inclined partition disposed below said overflow cylinder, said partition having a plurality of C-shaped valves therein, a tapered tube disposed at the center of said partition and disposed within said plurality of C-shaped valves of said partition, a ball valve disposed within said tapered tube for tightly fitting the tapered tube, a venting outlet disposed at said tank cover for connecting to an air outlet duct, a tubular ring configurated nozzle member disposed at the upper portion of said liquid tank, said nozzle member having a plurality of injection nozzles for completely washing and cleaning walls of said liquid tank and said overflow cylinder, a float disposed within said float containing room for maintaining the liquid in said liquid tank, a fan housing including a fan, said fan housing communicating with said air supply duct and said air inlet tube and, a motor connected to an electric source for actuating said fan, whereby the air cleaner can effectively clean dirty air and completely clean the internal surface of the overflow cylinder and the liquid tank, and serves another function as a humidifier.

2. The tank type liquid air cleaner of claim 1, wherein the liquid tank contains liquid filled to about one third of the distance from the bottom thereof for effectively operating the air cleaner.

3. The tank type liquid air cleaner of claim 1, wherein the liquid tank is provided with a transparent window attached to the middle portion thereof for indicating the level of the liquid in the liquid tank.

4. The tank type liquid air cleaner of claim 1, wherein the liquid is water.

5. The tank type liquid air cleaner of claim 1, wherein the tank cover is attached to the liquid tank for being tightly connected with rubber packing material to the circumference of the liquid tank.

6. The tank type liquid air cleaner of claim 1, wherein the float is connected to a float rod having an outer screw for screwing with an inner screw of a float cap so as to previously control the location thereof within the liquid tank.

7. The tank type liquid air cleaner of claim 6, wherein the float cap is operatively contacted with a microswitch to actuate a liquid supply on/off switch.

* * * * *